United States Patent

Hayashida

[11] Patent Number: 5,870,377
[45] Date of Patent: Feb. 9, 1999

[54] SATELLITE COMMUNICATIONS SYSTEMS USING A CROSS-CONNECT SWITCH

[75] Inventor: Masashi Hayashida, Tokyo, Japan

[73] Assignee: NEC Corporation, Japan

[21] Appl. No.: 364,483

[22] Filed: Dec. 27, 1994

[30] Foreign Application Priority Data

Dec. 28, 1993 [JP] Japan ................................. 5-338564

[51] Int. Cl.$^6$ ................................................. H04B 7/212
[52] U.S. Cl. ...................... 370/95.3; 455/13.1; 455/13.3
[58] Field of Search ........................ 370/81, 95.1, 95.3, 370/104.1; 455/13.1, 13.2, 13.3

[56] References Cited

U.S. PATENT DOCUMENTS

| | | | |
|---|---|---|---|
| 4,004,098 | 1/1977 | Shimasaki | 455/13.1 X |
| 4,456,988 | 6/1984 | Nakagome et al. | 455/13.3 X |
| 4,901,309 | 2/1990 | Turner | 370/60 |
| 5,065,395 | 11/1991 | Shenoi et al. | 370/81 |

Primary Examiner—Melvin Marcelo
Attorney, Agent, or Firm—Ostrolenk Faber Gerb & Soffen

[57] ABSTRACT

Each of the communications satellites going around the earth is equipped with a plurality of transmitters and receivers including receiving antennas in order to be able to transmit and receive signals in a plurality of directions, and a transmitter and a receiver in order to be able to transmit and receive signals between the closest terrestrial communications equipment. Each communications satellite is equipped with a cross-connect equipment, and has a function of transmitting signals that are received from each of the receivers toward other directions by utilizing the cross-connect equipment. Moreover, the communications satellites and the terrestrial communications equipment have respectively a function of transmitting and receiving signals consisting of communications frames having at their head address signals that indicate to which terrestrial communications equipment of the transmission destination they are intended for every time slot. Each communications satellite is equipped with four or more receivers to receive signals, and a cross-connect equipment which distributes the signals received by these receivers into four or more groups according to the transmitting terrestrial communications equipment based on the address signal for every time slot.

10 Claims, 4 Drawing Sheets

SATELLITE COMMUNICATIONS SYSTEMS USING A CROSS-CONNECT SWITCH

BACKGROUND OF THE INVENTION

1. Field of the Invention

The present invention relates to communications systems for performing communications among a plurality of communications satellites as well as communications among these communications satellites and a plurality of terrestrial communications equipment.

2. Description of the Related Art

It has been known that at least three communications satellites are required in order to cover the entire surface of the earth by satellite communications. A system by which radio communications are established among a plurality of terrestrial communications equipment via either one of the three geostationary communications satellities is known widely as a conventional satellite communications system. In the conventional satellite communications system of this kind, it is necessary that each one of these satellites has to be placed on a geostationary orbit. Moreover, because of the requirement to cover the surface of the earth with a small number of satellites, it is necessary that these satellites be placed on orbits of relatively high altitude of about 40 thousand kilo-meters above the surface of the earth. Because of this, it takes time for radio waves to make a round trip between a terrestrial equipment and a satellite, which increases the communication time. Moreover, there is a problem in that communication signals are apt to be interfered by noise making it difficult to obtain communications of high quality. Further, there is another problem that the transmission power of the terrestrial communications equipment has to be large accordingly.

In order to resolve these problems in the conventional satellite communications, a new satellite communications system, such as IRIDIUM Program, has been proposed in recent years. This is a system in which a large number of satellites are made to revolve around the earth at altitudes lower than the altitudes of the conventional communications satellites, and establish communications between the satellite and the terrestrial equipment. Since the altitudes of the satellites are reduced, it is possible to solve the problem of communication delay and the problem of noises mentioned above. According to this system, however, the altitude of the satellite is to be set low so that it is not possible to make the satellite geostationary. In addition, since it is not possible for a single satellite to cover a wide area, it is required to let a larger number of satellites than in the conventional system revolve around the earth.

The system according to the IRIDIUM Program has a significant feature in that it can resolve the problem related to the quality of communications existing in the conventional systems. However, the utility of the system is limited strictly to the communications from one point to another point on the earth. In spite of the large number of satellites involved, this system is not capable of handling at one's convenience the case of transmitting different data to different receiving destinations from one terrestrial station. In addition, communications among a plurality of ground points of three or more by providing them with a switching function are not feasible by this system, and in that sense the system cannot add a function which supersedes the conventional satellite communication functions.

SUMMARY OF THE INVENTION

It is the object of this invention to provide a satellite communications system which can improve the functional performance in the communications system, and especially makes it possible to establish communications with three or more other points by providing the system with a switching function.

In a cross-connect satellite communications system according to this invention, each of the communications satellites which go around the earth is equipped with a plurality of receivers including receiving antennas in order to be able to receive radio signals coming from a plurality of directions. Similarly, the communications system is equipped with a plurality of transmitters in order to be able to transmit radio signals in a plurality of directions. In addition to the above, the communications system is equipped with a transmitter-receiver in order to be able to transmit and receive signals between the closest terrestrial communications equipment at the time of transmission and reception. Moreover, each communications satellite has a cross-connect equipment on board, and has the function of transmitting signals received from each of the transmitters and receivers toward other directions using its cross-connect equipment. In particular, these transmitters and receivers are placed on board as many in number as there are terrestrial stations and adjacent communications satellites with which signal transmission and reception can be achieved. Since a minimum of three adjacent communications satellites are anticipated, by adding the number necessary for communication with the terrestrial communications equipment, at least four sets of the transmitters and receivers are placed on board the satellite.

The communications satellite and the terrestrial communications equipment are equipped with the function of transmitting and receiving signals consisting of communication frames with compressed bandwidth. The communication frame has at the head of each time slot an address signal which indicates to which of the terrestrial communications equipment among the the transmission destinations it is intended. Each of the communications satellites is equipped with four or more receivers for receiving signals as mentioned above, and a cross-connect equipment which distributes the signals received by these receivers into four or more groups by the terrestrial station of transmission destinations based on the address signals for every time slot. Moreover, the communications satellite is characterized in that it is further equipped with four or more digital speech interpolation (DSI) parts which create signals by recombining a plurality of distributed signals classified by the cross-connect equipment into communication frames, and four or more transmitters which transmit the signals from the DSI parts to either of three or more communications satellites adjacent to the communications satellite concerned or a terrestrial communications equipment.

BRIEF DESCRIPTION OF THE DRAWINGS

The above-mentioned and other objects, features and advantages of the present invention will become more apparent from the following detailed description when taken in conjunction with the accompanying drawings, wherein.

DETAILED DESCRIPTION OF THE PREFERRED EMBODIMENTS

Next, referring to FIG. 1, the basic constitution of the satellite communications system to which is applied the cross-connect satellite communications system of this invention is applied, will be described.

Figure 1:
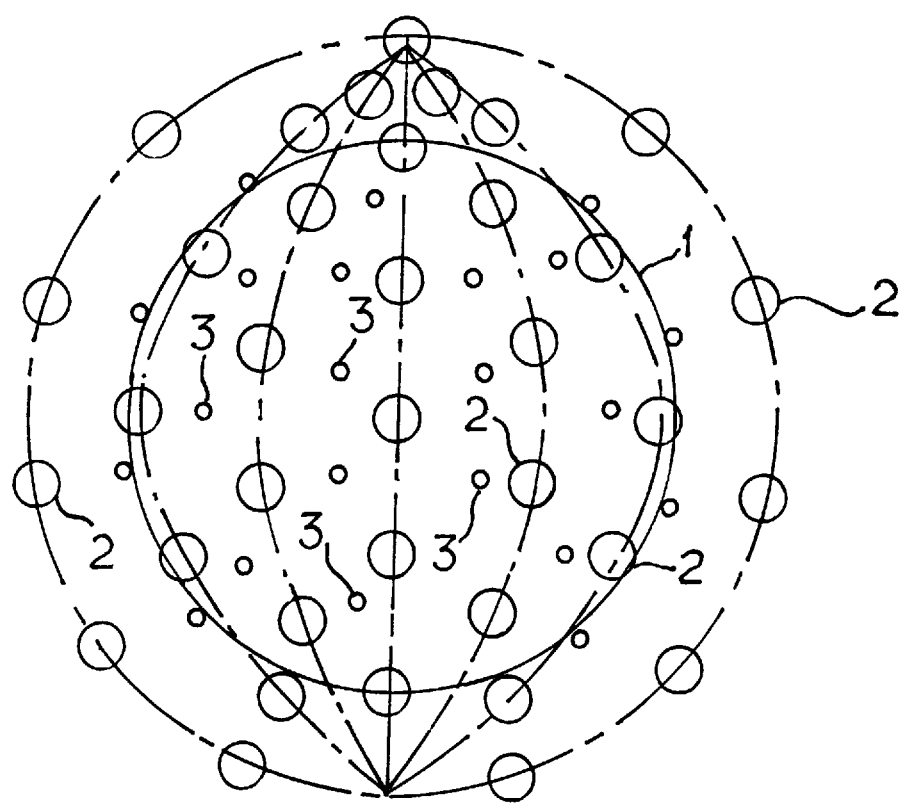
FIG. 1 is a diagram showing the constitution of the system utilizing a plurality of communications satellites to which is applied the cross-connect satellite communications system of this invention.

FIG. 1 shows the relation among the communications satellites, the terrestrial communications equipment and the earth. A large number of satellites 2 which go around the earth at altitudes lower than the altitudes of the satellites in the conventional satellite communications system mentioned in the beginning are arranged in the periphery of the earth 1. These satellites 2 are moving on the same longitude from, for example, the north pole to the south pole, and again to the north pole. In that case, the altitude of each satellite is kept at substantially the same level, and hence, the satellite continues the motion with substantially the same speed in a state where the positional relationship among the adjacent satellites is maintained. On the other hand, on the surface of the earth, there are installed terrestrial stations equipped with the terrestrial communications equipment 3 at a plurality of prescribed locations.

These communications satellites 2 and the terrestrial communications equipment 3 have individual transmitters and receivers. Using these these devices, radio communications can be established among a terrestrial communications equipment 3 and communications satellites 2 which are in its neighborhood, and among the adjacent communications satellites 2. Since the communications satellites 2 are arranged at low altitudes, the region over which a single communications satellite can communicate with the terrestrial stations is limited. However, a large number of these communications satellites are arranged with prescribed spacings so that it becomes possible to communicate with a terrestrial communications equipment located anywhere on the surface of the earth.

Figure 2:
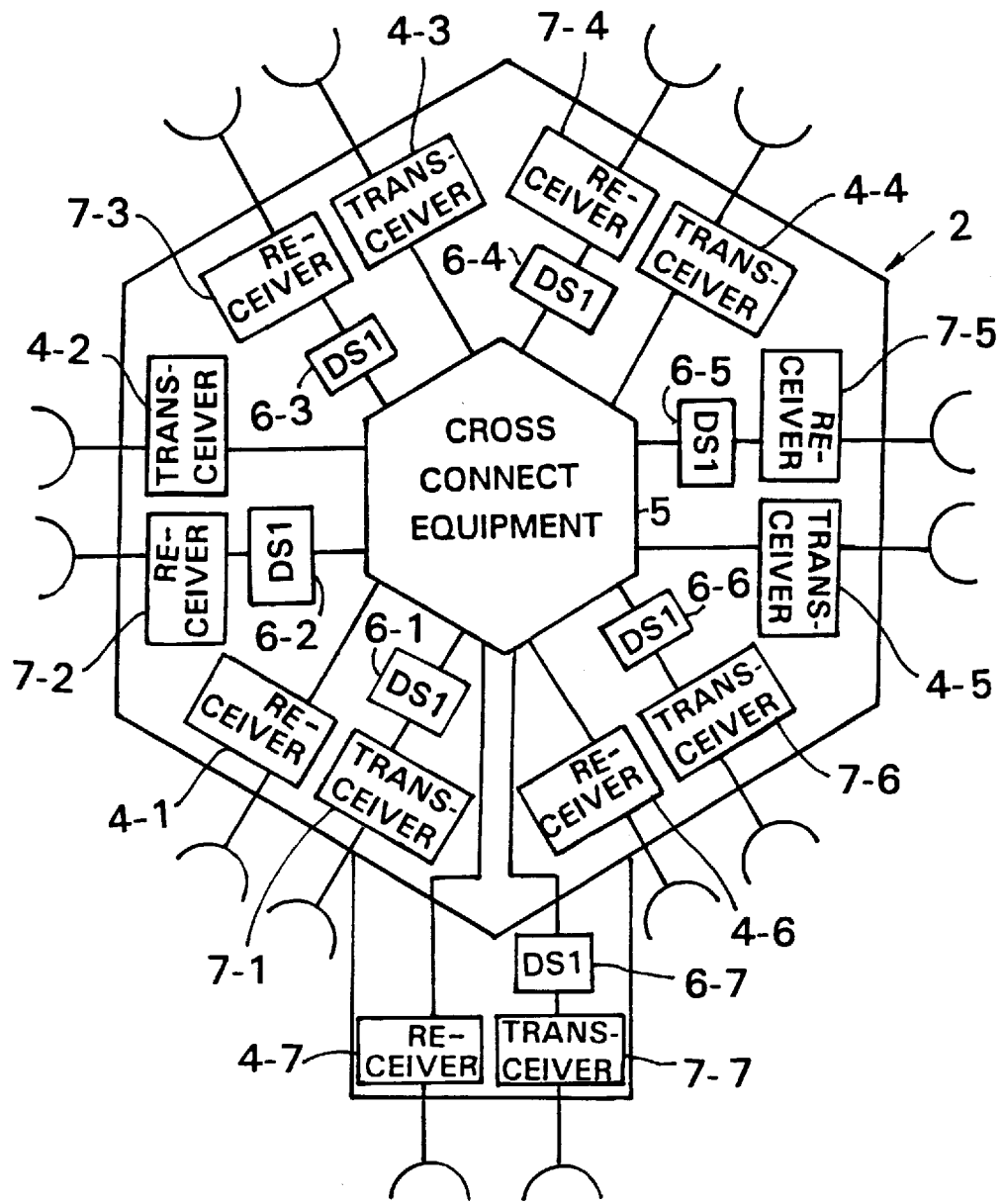
FIG. 2 is a diagram showing an embodiment of the constitution of the satellite with the cross-connected satellite communications system of the invention.

FIG. 2 is a diagram showing an embodiment of the configuration of a satellite constituting the cross-connect satellite communications system according to this invention. As shown in the figure, the communications satellite used in the cross-connect satellite communications system of this invention has a plurality of receivers 7-1 to 7-6 including receiving antennas 8-1 to 8-6 in order to be able to receive radio signals coming from respective directions corresponding to a plurality of communications satellites that are going around the earth. In addition, it has a plurality of transmitters 4-1 to 4-6 in order to be able to transmit radio signals in a plurality of directions. Besides the above, it has a transmitter and a receiver 4-7 and 7-7 and a receiving antenna 8-7 in order to be able to transmit or receive radio signals between the closest terrestrial communications equipment at the time of transmission or reception.

Moreover, each communications satellite is furnished with a cross-connect equipment 5. The communications satellite has a function to transmit signals received from each of these receivers toward desired adjacent communications satellites or terrestrial communications equipment that are indicated within the signals, by utilizing the cross-connect equipment. In particular, the transmitters and the receivers are placed on board the satellite as many in number as there are terrestrial stations and adjacent communications satellites with which it can communicate. Since a minimum of three is anticipated as the number of adjacent communications satellites, a communications satellite is equipped with at least four sets of transmitters and receivers by adding the component needed for communication with the terrestrial communications equipment.

In this embodiment, the case in which the number of the adjacent communications satellite is six is imagined. Namely, each communications satellite is considered to be going around the earth by maintaining a positional relationship in which it is always surrounded by six communications satellites. Accordingly, as indicated in the figure, these six antennas 8-1 to 8-6 in this embodiment are set pointing toward six directions with equal covering angles within a plane perpendicular to the vertical direction. Further, each communications satellite 2 is equipped with a transmitter 4-7 and a receiver 7-7 having an antenna 8-7 pointing toward the earth in order to be able to communicate with the terrestrial communications equipment 3 of a terrestrial station.

Further, a communications satellite 2 is furnished with a cross-connect equipment 5, and each one of the transmitters 4-1 to 4-7 and the receivers 7-1 to 7-7 is connected to the cross-connect equipment 5. With the aid of the cross-connect equipment 5, it is possible to transmit signals received from adjacent communications satellites 2 or terrestrial communications equipment 3 toward other communications satellites or terrestrial communications equipment that are designated. Accordingly, by utilizing the cross-connection function possessed by each communications satellite, it becomes possible to perform satellite communications among a plurality of terrestrial communications equipment by providing them with a switching function for the system as a whole. It is to be noted that a constitution as, for example, shown in FIG. 7 and FIG. 18 of U.S. Pat. No. 4,901,309 has been known as the cross-connect equipment to be used in this invention.

Next, a specific configuration and operation for performing the cross connection in the cross-connect satellite communications system of this invention will be described.

In an embodiment of the cross-connect satellite communications system according to this invention, the communications satellite 2 and the terrestrial communications equipment 3 are furnished with a function which transmit and receive signals consisting of communication frames with compressed bandwidth in order to make a terrestrial station to be able to communicate with another terrestrial station via a single or a plurality of communications satellites. The communication frame has at the head of every time slot an address signal which indicates to which one of the terrestrial communications equipment 3 it is intended.

Each of the communications satellites is equipped with four or more receivers for receiving signals, and a cross-connect equipment which distributes the signals received by these receivers into four or more parts according to terrestrial stations for transmission, based on the address signals in each time slot. Further, each communications satellite is equipped with the DSI parts 6-1 to 6-7 and 9-1 to 9-7 connected to the cross-connect equipment 5 in order to create signals by recombining a plurality of distributed signals classified by the cross-connect equipment into communication frames.

Figure 3:
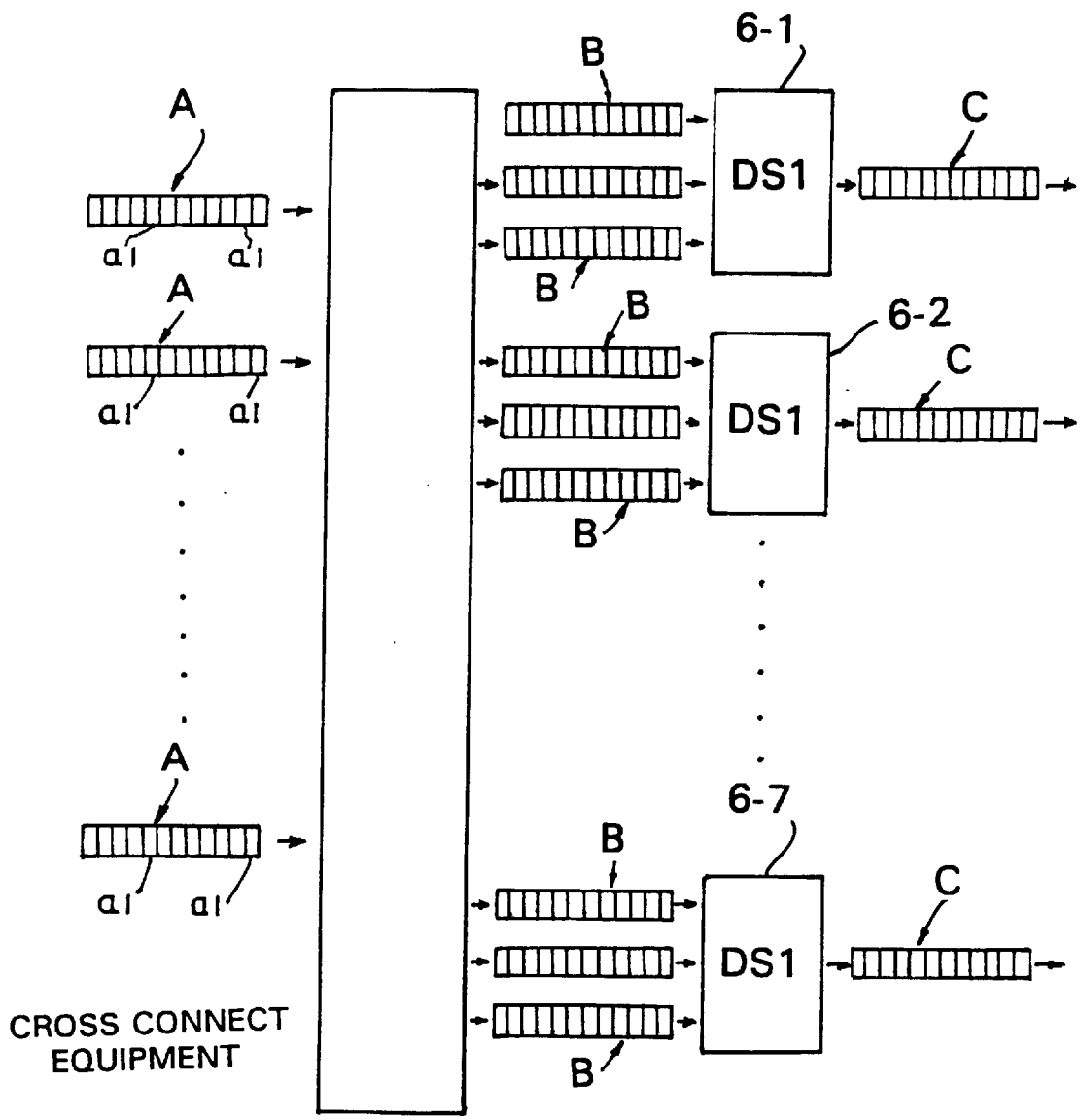
FIG. 3 is a diagram for describing signal processing in the embodiment of the cross-connect satellite communications system of the invention.

Each communications satellite 2 and terrestrial communications equipment 3 transmits and receives a communication signal A consisting of a plurality of communication frames which are bandwidth compressed as shown in FIG. 3. Here, each communications satellite 2 and terrestrial communications equipment 3 are assigned in advance with a proper address for identification. In a signal A there is added an address signal ad in front of data D of every time slot a1 to identify the terrestrial communications equipment of a terrestrial station which is the transmission destination.

As shown in FIG. 3, the cross-connect equipment 5 classifies the signals A from the receivers 4-1 to 4-7 for every time slot a1 into groups equal to the number of transmitters, for example, six groups in this embodiment, by the DSI parts which are not shown, based on the address signal ad. After that, the distributed signals are output by the cross-connect equipment 5 to some of the transmitters 4-1 to 4-7 which transmit the signals to adjacent communications satellites that need be passed through in order to transmit the signals to the final terrestrial communications equipment 3. Signals output from the various output ends are assigned, for every time slot, respective transmission destinations by the DSI parts 6-1 to 6-7, and are grouped into separate signals before they are transmitted. Signals C from the DSI parts 6-1 to 6-7 are transmitted as signals A from the transmitters 7-1 to 7-7 to the six communications satellites 2 and the terrestrial communications equipment 3 that are adjacent to the communications satellite 2 having the transmitters 7-1 and 7-7 on board.

Figure 4:
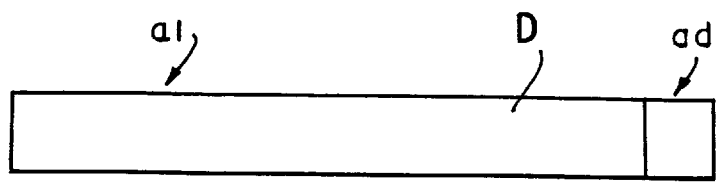
FIG. 4 is a diagram for describing the constitution of the signal frame used in the cross-connect satellite communications system of the invention.

Now, it becomes necessary to determine the communications satellites 2 through which communication from one terrestrial communications equipment to another has to go. For this purpose, each communications satellite 3 is also assigned in advance with a proper identifier. This identifier is added to the address data ad shown in FIG. 4 for identifying the terrestrial communications equipment of the transmission destination. The addition of the identifiers to the communications satellites takes place prior to the transmission of communication data from a terrestrial communications equipment 3, and the next adjacent communications satellites are determined by sequentially reading the identifiers at the communications satellites that are passed by.

Apart from the above method, the communications satellite which should be passed through next in order to reach the final destination may be determined on each communications satellite based on the position information about every communications satellite at the time of performing cross-connection using the equipment placed on board the communications satellite. In other words, the positions of all the communications satellites are computed on respective communications satellites from the revolving orbits and the like. The route of the communications satellites which gives the shortest distance is determined successively for the terrestrial communications equipment 3 of the destination based on the computed positions of respective communications satellites 2, and according to the result obtained, the communications satellite to which the communication is to be transmitted is determined.

Figure 5:
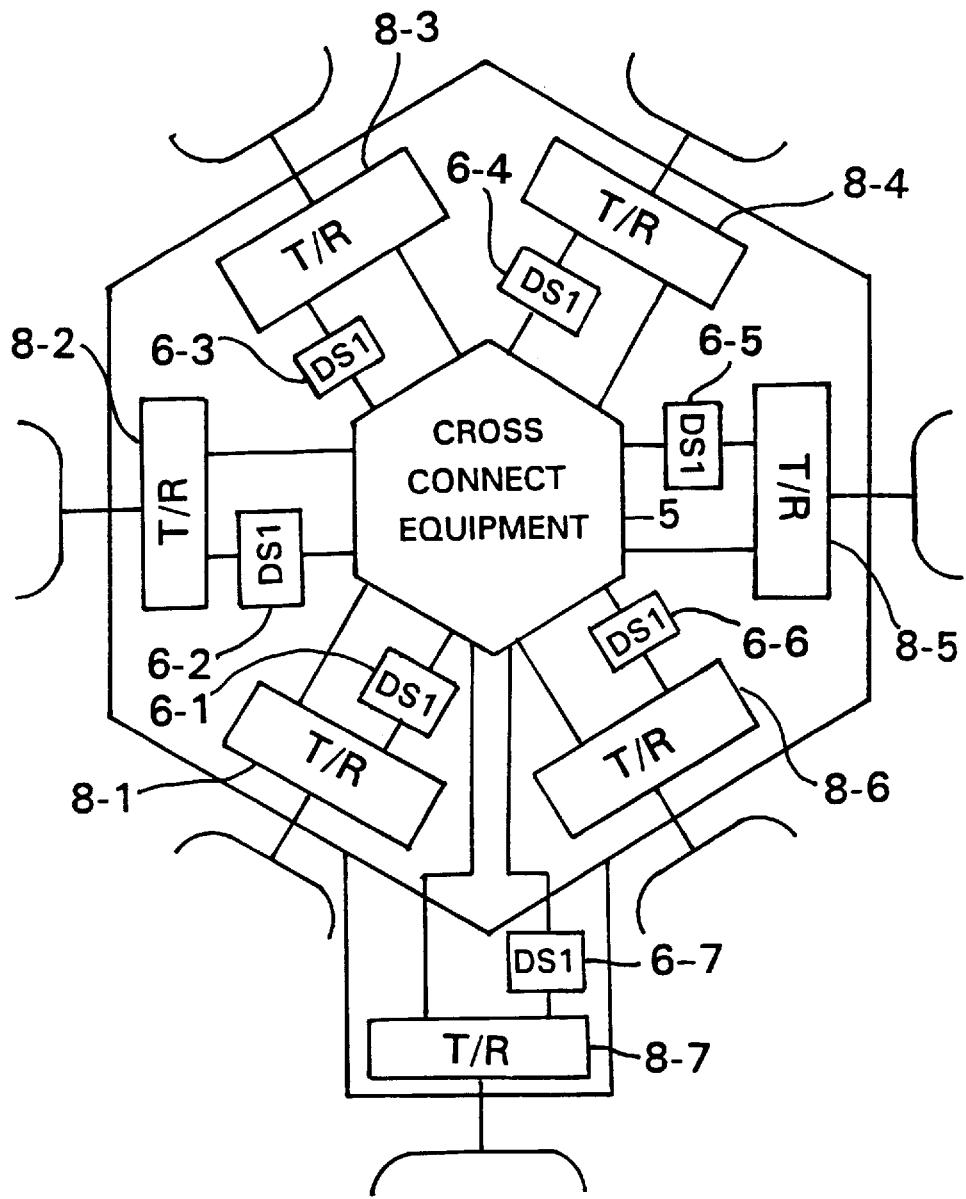
FIG. 5 is a diagram showing another embodiment of the constitution of the cross-connect satellite communications system of the invention.

Here, another embodiment of this invention may be mentioned in which the satellite communications system is constituted of transmitters-receivers 8-1 to 8-7 as shown in FIG. 5, in place of the transmitters 4-1 to 4-7 and the receivers 7-1 to 7-7 in the above-mentioned embodiment, which integrate the functions of the latter devices.

Furthermore, the satellite communications system according to this invention is not limited to those illustrated in the embodiments. Namely, it is only necessary that each of the communications satellite is equipped with a cross-connect equipment which distributes the signals into four or more parts according to the destinations based on the address signals in every time slot, four or more DSI parts which create signals by recombining the plurality of distributed signals classified into communication frames by the cross-connect equipment, and four or more transmitters which transmit the signals from the DSI parts to three or more communications satellites and terrestrial communications equipment adjacent to the communications satellite concerned. In that case, too, the satellite communications system according to this invention may be constituted of four or more transmitters-receivers in place of the four or more receivers and four or more transmitters.

As described in the above, according to the satellite communications system of this invention, it becomes possible, in a system for carrying out communication between terrestrial communications equipment, to impart a switching function to the communications satellite itself by furnishing the communications satellite with a cross-connect equipment. In this way, it is possible to carry out satellite communications with high efficiency by specifying a transmission destination and a transmission source among a plurality of terrestrial communications equipment. Further, it becomes possible to classify a signal from a certain terrestrial communications equipment to transmission destinations for each frame. Similarly, it is possible to bundle together signals from other terrestrial communications equipment and transmit it to another terrestrial communications equipment.

Although the invention has been described with reference to specific embodiments, this description is not meant to be construed in a limiting sense. Various modifications of the disclosed embodiments, as well as other embodiments of the invention, will becomes apparent to persons skilled in the art upon reference to the description of the invention. It is therefore contemplated that the appended claims will cover any modifications or embodiments as fall within the true scope of the invention.

What is claimed is:

1. A cross-connect satellite communications system comprising:

a plurality of terrestrial communications equipment arranged on the earth; and a plurality of communication satellites which move at prescribed speeds and in prescribed directions with respect to the surface of the earth and orbit the earth;

each of said communications satellites including:

a first plurality of receivers having receiving antenna for satellite signal reception which receive signals coming from at least three directions;

a first plurality of transmitters for transmitting signals in at least three directions;

a second plurality of receivers having antenna for terrestrial signal reception which receive signals from at least one of said plurality of terrestrial communications equipment; and a second plurality of transmitters for transmitting signals toward at least one of said plurality of terrestrial communications equipment;

said communications satellites are equipped with a cross-connect switch which is responsive to transmission destinations to perform switching operations between said first and second receivers and said first and second transmitters;

each of said first and second transmitters being adapted for transmitting a signal including communication frames with compressed bandwidth, and each of said first and second receivers being adapted for receiving a signal including communications frames with compressed bandwidth, wherein said communication frame has at the head of each time slot an address signal which indicates to which of the terrestrial communications equipment among the transmission destinations the time slot is intended.

2. The cross-connect satellite communications system as claimed in claim 1, wherein said cross-connect switch has a distributing function per transmission destination which distributes signals from each adjacent unit of said communications satellites and said terrestrial communications equipment received by each of said first and second receivers according to the terrestrial communications equipment among transmission destinations based on the address signals for every time slot of said communication frames, and generates respective signals per transmission destination.

3. The cross-connect satellite communications systems as claimed in claim 2, wherein said cross-connect switch has a collecting function per transmission direction which outputs signals per transmission direction by collecting said signals per transmission destination for every adjacent communications satellite or terrestrial communications equipment that are in the same direction.

4. The cross-connect satellite communications systems as claimed in claim 3, wherein said cross-connect switch transmits said collected signals per transmission direction from respective units of said transmitters toward respective adjacent units of said communications satellites or terrestrial communications equipment.

5. The cross-connect satellite communications systems as claimed in claim 4, wherein said cross-connect switch is equipped with respective units of said distributing function per transmission destination on the side where signals from respective units of said receivers are inputted, and is equipped with respective unit of said collecting function per transmission direction on the side where signals are outputted to respective units of said transmitters.

6. The cross-connect satellite communications systems as claimed in claim 5, wherein each of said communications satellites has a proper identifier for identifying it from other communications satellites, said address signals include said identifiers of the communications satellites which have to be passed by in order to reach said terrestrial communications equipment designated as the transmission destination, and the adjacent communications satellites or the terrestrial communications equipment which will become sequentially the next transmission destinations are determined by said identifiers.

7. The cross-connect satellite communications systems as claimed in claim 5, wherein each of said communications satellites successively computes the route of the communications satellites which forms the shortest route for said terrestrial communications equipment designated as the transmission destination, and determines an adjacent unit of said communications satellites to which the signal is to be transmitted.

8. The cross-connect satellite communications systems as claimed in claim 2, wherein said distributing function according to the transmission destination is fulfilled by a digital speech interpolation part.

9. The cross-connect satellite communications systems as claimed in claim 3, wherein said collecting function according to the transmission direction is fulfilled by a digital speech interpolation part.

10. The cross-connect satellite communications systems as claimed in claim 1, wherein said cross-connect switch demultiplexes, in response to the destination signals, each received signal from each adjacent unit of said communications satellites and said terrestrial communications equipment into demultiplexed signals, and multiplexes said demultiplexed signals into a multiplexed signal in each destination.

* * * * *